(12) United States Patent
Ai et al.

(10) Patent No.: US 12,394,023 B2
(45) Date of Patent: Aug. 19, 2025

(54) IMAGE DENOISING METHOD AND APPARATUS, ELECTRONIC DEVICE, AND STORAGE MEDIUM (71) Applicant: SANECHIPS TECHNOLOGY CO., LTD., Guangdong (CN)

(72) Inventors: Jisong Ai, Guangdong (CN); Ke Xu, Guangdong (CN); Dehui Kong, Guangdong (CN); Ning Wang, Guangdong (CN); Xin Liu, Guangdong (CN); Jing You, Guangdong (CN); Fang Zhu, Guangdong (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 416 days.

(21) Appl. No.: 17/921,271

(22) PCT Filed: Apr. 22, 2021

(86) PCT No.: PCT/CN2021/088927
§ 371 (c)(1),
(2) Date: Oct. 25, 2022

(87) PCT Pub. No.: WO2021/218765
PCT Pub. Date: Nov. 4, 2021

(65) Prior Publication Data
US 2023/0230206 A1 Jul. 20, 2023

(30) Foreign Application Priority Data
Apr. 27, 2020 (CN) .......................... 202010346311.9

(51) Int. Cl.
G06T 5/70 (2024.01)
G06T 5/20 (2006.01)

(52) U.S. Cl.
CPC .................. *G06T 5/70* (2024.01); *G06T 5/20* (2013.01); *G06T 2207/20081* (2013.01)

(58) Field of Classification Search
CPC ... G06T 5/70; G06T 5/20; G06T 2207/20081; G06T 5/60; G06T 2207/20084;
(Continued)

(56) References Cited

U.S. PATENT DOCUMENTS 11,756,160 B2 * 9/2023 Park ....................... G06N 3/048
382/276
11,948,274 B1 * 4/2024 Vavilala ................. G06N 3/045
(Continued)

FOREIGN PATENT DOCUMENTS

CN 110232361 A 9/2019
CN 110443867 A 11/2019
(Continued)

OTHER PUBLICATIONS

B. Park, S. Yu and J. Jeong, "Densely Connected Hierarchical Network for Image Denoising," 2019 IEEE/CVF Conference on Computer Vision and Pattern Recognition Workshops (CVPRW), Long Beach, CA, USA, 2019, pp. 2104-2113, doi: 10.1109/CVPRW. 2019.00263. (Year: 2019).*
(Continued)

*Primary Examiner* — Andrae S Allison
(74) *Attorney, Agent, or Firm* — Li & Cai Intellectual Property (USA) Office (57) ABSTRACT The present application relates to the field of image processing, and provides an image denoising method and apparatus, an electronic device and a storage medium. The image
(Continued)

```
┌─────────────────────────────────────┐
│  Acquire an image to be processed   │ ─── 101
└─────────────────────────────────────┘
                   │
                   ▼
┌─────────────────────────────────────┐
│ Input the image to be processed into│
│ an image denoising model to acquire │ ─── 102
│        a denoised image             │
└─────────────────────────────────────┘
``` denoising method includes: acquiring an image to be processed, and inputting the image to be processed into an image denoising model to acquire a denoised image, wherein the image denoising model is a model formed by combining a U-shaped network, a residual network and a dense network.

11 Claims, 9 Drawing Sheets

(58) Field of Classification Search
CPC ...... G06N 3/045; G06N 3/0464; G06N 3/047; G06N 3/0475; G06N 3/084; G06N 3/094
See application file for complete search history.

(56) References Cited

U.S. PATENT DOCUMENTS

| | | | |
|---|---|---|---|
| 2019/0128989 A1 | 5/2019 | Braun et al. | |
| 2020/0074271 A1* | 3/2020 | Liang | G06V 10/82 |
| 2021/0287342 A1* | 9/2021 | Yang | G06T 5/50 |
| 2022/0327700 A1* | 10/2022 | Zaharchuk | A61B 6/4417 |
| 2023/0419447 A1* | 12/2023 | Cetinkaya | G06T 3/4046 |
| 2024/0062332 A1* | 2/2024 | Yoon | G01R 33/4818 |

FOREIGN PATENT DOCUMENTS

| | | |
|---|---|---|
| CN | 110473154 A | 11/2019 |
| CN | 110599409 A | 12/2019 |
| CN | 110610464 A | 12/2019 |
| CN | 110753935 A | 2/2020 |
| CN | 110910329 A | 3/2020 |

OTHER PUBLICATIONS

Wang, Y.; Zhao, L.; Liu, L.; Hu, H.; Tao, W. URNet: A U-Shaped Residual Network for Lightweight Image Super-Resolution. Remote Sens. 2021, 13, 3848. https://doi.org/ 10.3390/rs13193848 (Year: 2021).*
China Patent Office, CN202010346311.9 First Office Action issued on Mar. 30, 2024.
Dong-Wook Kim et al., "GRDN: Grouped Residual Dense Network for Real Image Denoising and GAN-based Real-world Noise Modeling," 2019 IEEE/CVF Conference on Computer Vision and Pattern Recognition Workshops, Dec. 31, 2019.
European Patent Office, EP21795374.4 Extended European Search Report issued on Apr. 15, 2024.
Park Bumjun et al., "Densely Connected Hierarchical Network for Image Denoising," 2019 IEEE/CVF Conference on Computer Vision and Pattern Recognition Workshops, Jun. 16, 2019.
Adrian Bulat et al., "To learn image super-resolution, use a GAN to learn how to do image degradation first," issued on Jul. 30, 2018.
Yulun Zhang et al., "Residual Dense Network for Image Restoration," Journal of Latex Class Files, vol. 13, No. 9, Sep. 2014.
Song Yuda et al., "Dynamic Residual Dense Network for Image Denoising," Sensors,vol. 19, No. 17, Sep. 3, 2019.
WIPO, International Search Report issued on Jul. 21, 2021.

* cited by examiner

IMAGE DENOISING METHOD AND APPARATUS, ELECTRONIC DEVICE, AND STORAGE MEDIUM

CROSS-REFERENCE TO RELATED APPLICATIONS

The present disclosure is a National Phase Application filed under 35 U.S.C. 371 as a national stage of PCT/CN2021/088927, filed on Apr. 22, 2021, an application claiming the priority to Chinese Patent Application No. CN202010346311.9 filed on Apr. 27, 2020, the entire contents of which are incorporated herein by reference.

TECHNICAL FIELD

The present application relates to the field of image processing technology.

BACKGROUND

Image denoising has always been an important part of the image processing field, and particularly in recent years, stellar cameras have become popular in the monitoring field. Due to bad illumination conditions and insufficient light sensitivity of the sensor, captured images will have lots of noises left thereon. Therefore, the acquired image or video has a lower resolution than those captured under good illumination conditions. As a result, not only the visual effect, but also the accuracy in recognition of a moving object in the image or video to be recognized, are affected. Therefore, there is an urgent need for a denoising method to improve the image quality.

SUMMARY

In one aspect, an embodiment of the present application provides an image denoising method, including: acquiring an image to be processed; and inputting the image to be processed into an image denoising model to acquire a denoised image, wherein the image denoising model is a model formed by combining a U-shaped network, a residual network and a dense network.

In one aspect, an embodiment of the present application provides an image denoising apparatus, including: a first acquisition module configured to acquire an image to be processed; and a second acquisition module configured to input the image to be processed into an image denoising model to acquire a denoised image, wherein the image denoising model is a model formed by combining a U-shaped network, a residual network and a dense network.

In one aspect, an embodiment of the present application provides an electronic device, including: one or more processors; and a memory configured to store one or more programs, wherein the one or more programs, when executed by the one or more processors, cause the one or more processors to implement the image denoising method according to the embodiment of the present application.

In one aspect, an embodiment of the present application provides a storage medium having a computer program stored thereon which, when executed by a processor, causes to processor to implement the image denoising method according to the embodiment of the present application.

DETAIL DESCRIPTION OF EMBODIMENTS

For clarity and better understanding of the objects, technical solution and advantages of the present application, embodiments of the present application will be described in detail below in conjunction with the accompanying drawings. It should be noted that the embodiments of the present application and features therein may be combined with each other in any manner as long as they are not contradictory.

Image denoising is crucial to improvement of image quality. A current adaptive denoising algorithm based on a neural network with a good effect is a supervised learning type neural network algorithm. In this algorithm, the training sample includes a pair of input sample and output sample, and parameters in the neural network are updated through a gradient descent algorithm so that the output of the input of the training sample after passing through the neural network is close to a truth value sample.

However, the current adaptive denoising algorithm cannot achieve good denoising performance while considering the quality of the denoised image.

Figure 1:
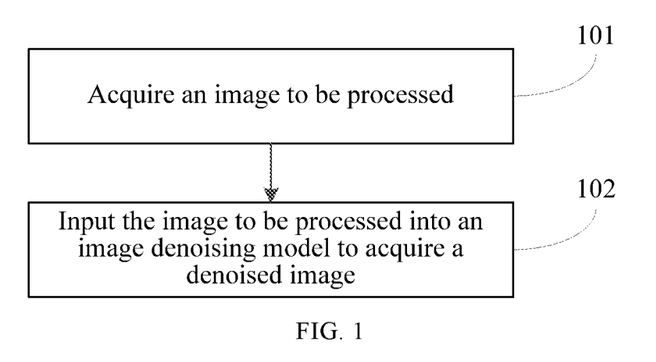
FIG. 1 is a flowchart of an image denoising method according to the present application.

FIG. 1 is a flowchart of an image denoising method according to the present application. The image denoising method is applicable to a scenario for denoising an image, and may be executed by an image denoising apparatus. The image denoising apparatus may be implemented in software and/or hardware, or may be integrated in an electronic device. As shown in FIG. 1, the image denoising method of the present application may include operations 101 and 102.

At operation 101, acquiring an image to be processed.

At operation 102, inputting the image to be processed into an image denoising model to acquire a denoised image. The image denoising model is a model formed by combining a U-shaped network, a residual network and a dense network.

In a possible implementation, the image to be processed may be an image captured by a front end monitoring device, or an image frame in a video captured by the front end monitoring device. Apparently, the image to be processed in the present application may also be an image in other fields, such as a medical image, or the like.

The image denoising model in the present application may be a pre-trained model. The model is a model formed by combining a U-shaped network, a residual network and a dense network. The U-shaped network, i.e., Unet, in the present application refers to a network having a "U" shape and including a feature extraction (i.e., encoding) part and an upsampling (i.e., decoding) part. The residual network in the present application refers to a network including a direct mapping part and a residual part, where the direct mapping part and the residual part are subjected to an addition operation. The dense network in the present application refers to a network including a direct mapping part and a residual part, where the direct mapping part and the residual part perform channel joining.

The image denoising model of the present application can, in combination with characteristics of the residual network and the dense network, better utilize deep and shallow features of the image to be processed; and remove noises while reserving details of the image to be processed as much as possible, thereby considering the quality of the denoised image while achieving better denoising performance.

Figure 2:
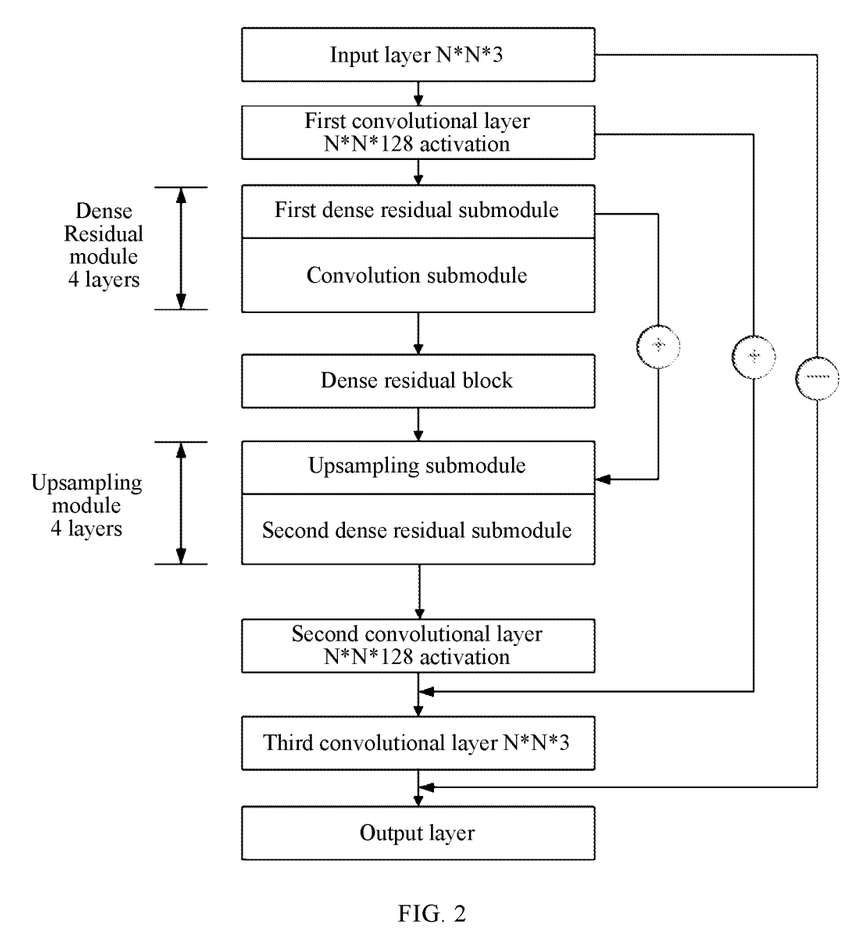
FIG. 2 is a schematic structural diagram of an image denoising model according to the present application.

FIG. 2 is a schematic structural diagram of an image denoising model according to the present application. As shown in FIG. 2, the image denoising model of the present application may include: an input layer, a first convolutional layer, at least one dense residual module, a dense residual block, at least one upsampling module, a second convolutional layer, a third convolutional layer, and an output layer which are connected in sequence.

A subtraction operation is performed on an output of the input layer and an output of the third convolutional layer, and a result of the subtraction operation is input to an input of the output layer.

An addition operation is performed on an output of the first convolutional layer and an output of the second convolutional layer, and a result of the addition operation is input to an input of the third convolutional layer.

The dense residual module includes a first dense residual submodule and a convolution submodule which are connected in sequence, and the upsampling module includes an upsampling submodule and a second dense residual submodule which are connected in sequence. An addition operation is performed on an output of the first dense residual submodule and an input of the upsampling submodule.

In a possible implementation, 4 dense residual modules may be provided, and 4 upsampling modules may be provided.

When a plurality of dense residual modules as well as a plurality of upsampling modules are provided, a mapping relationship between the dense residual modules and the upsampling modules may be established. According to the mapping relationship, the addition operation is performed on the output of the first dense residual submodule in the dense residual module and the input of the upsampling submodule in the corresponding upsampling module in the mapping relationship.

In the image denoising model, the image to be processed input from the input layer has a resolution of N*N, and the number of channels is 3. The first convolutional layer has a convolutional kernel of 3*3, and the number of channels becomes 128. The convolutional kernel in the convolution submodule is also 3*3, with a span of 2. The second convolutional layer and the third convolutional layer each have a convolutional kernel of 3*3. The number of channels in the second convolutional layer is 128, and the number of channels in the third convolutional layer is 3.

Figure 3:
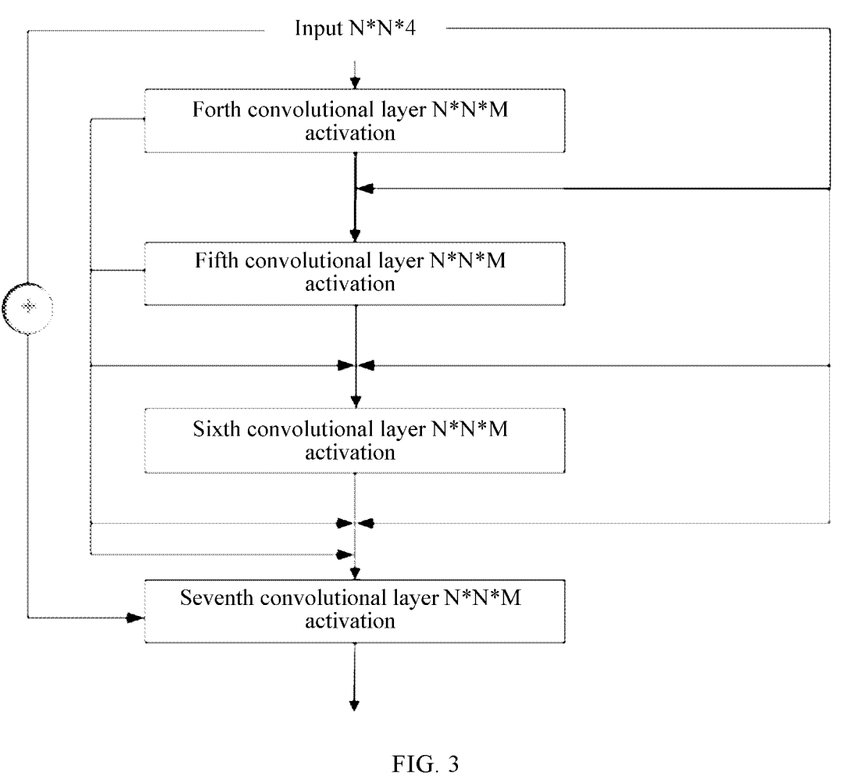
FIG. 3 is a schematic structural diagram of a first dense residual submodule in the image denoising model according to the present application.

FIG. 3 is a schematic structural diagram of a first dense residual submodule in the image denoising model according to the present application. As shown in FIG. 3, more specifically, the first dense residual submodule may include: a fourth convolutional layer, a fifth convolutional layer, a sixth convolutional layer, and a seventh convolutional layer which are connected in sequence.

An addition operation is performed on an input of the fourth convolutional layer and an input of the seventh convolutional layer. A fusion operation is performed on an input of the fifth convolutional layer and the input of the fourth convolutional layer. A fusion operation is performed on an input of the sixth convolutional layer, an output of the fourth convolutional layer, and the input of the fourth convolutional layer. A fusion operation is performed on the input of the seventh convolutional layer, the input of the fourth convolutional layer, an output of the fifth convolutional layer, and the output of the fourth convolutional layer.

In one possible implementation, the fusion operation in the present application refers to channel joining in a dense network.

It should be noted that the second dense residual submodule and the dense residual block have the same structure as the first dense residual submodule, and thus are not repeated here.

The fourth convolutional layer, the fifth convolutional layer, and the sixth convolutional layer each have a convolutional kernel of 3*3. The seventh convolutional layer has a convolutional kernel of 1*1. M is used to represent the number of channels in the fourth convolutional layer, the fifth convolutional layer, the sixth convolutional layer or the seventh convolutional layer.

The image denoising method of the present application may include: acquiring an image to be processed, and inputting the image to be processed into an image denoising model to acquire a denoised image. The image denoising model is a model formed by combining a U-shaped network, a residual network and a dense network. The image denoising model of the present application can, in combination with characteristics of the residual network and the dense network, better utilize deep and shallow features of the image to be processed, and remove noises while reserving details of the image to be processed as much as possible, thereby considering the quality of the denoised image while achieving better denoising performance.

Figure 4:
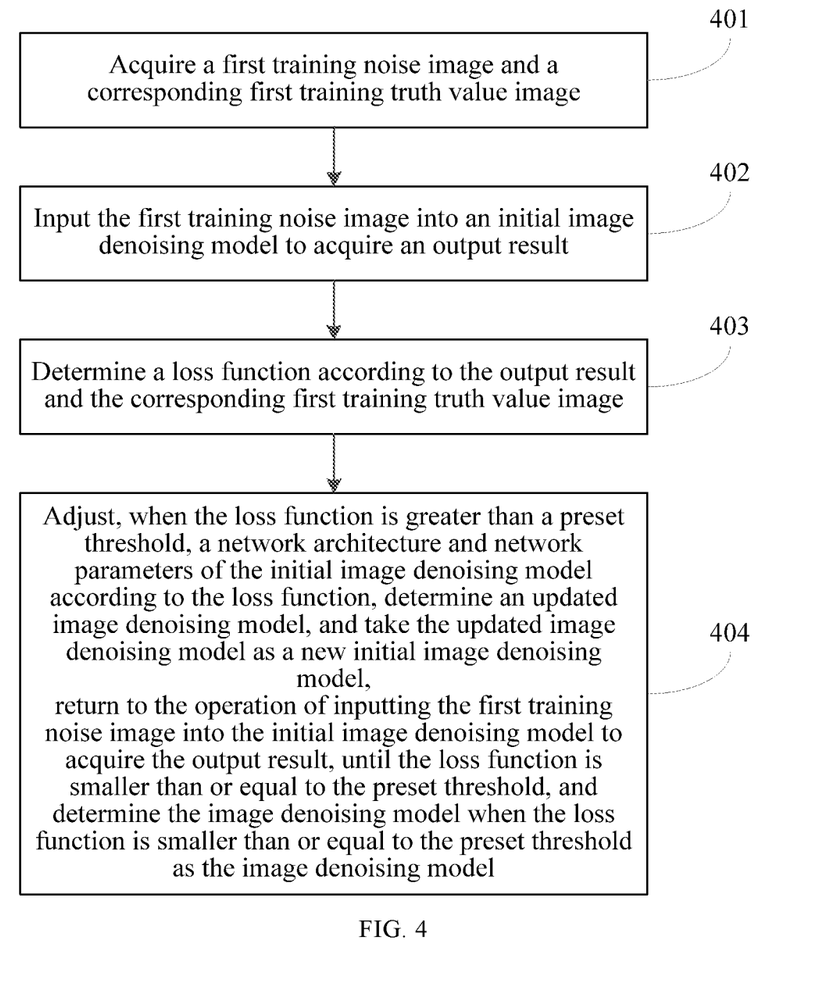
FIG. 4 is another flowchart of an image denoising method according to the present application.

FIG. 4 is another flowchart of an image denoising method according to the present application. Based on the possible implementation shown in FIG. 1 and various optional solutions, an embodiment of the present application describes in detail how to train the image denoising model. Only operations involved in training the image denoising model are illustrated in the embodiment of the present application. As shown in FIG. 4, the image denoising method according to the embodiment of the present application may include the following operations 401 to 404.

At operation 401, acquiring a first training noise image and a corresponding first training truth value image.

In a possible implementation, the first training noise image and the corresponding first training truth value image may be acquired by actual capturing.

In another possible implementation, the first training noise image and the corresponding first training truth value image may be acquired by actually capturing and by means of an adversarial network.

Figure 5A:
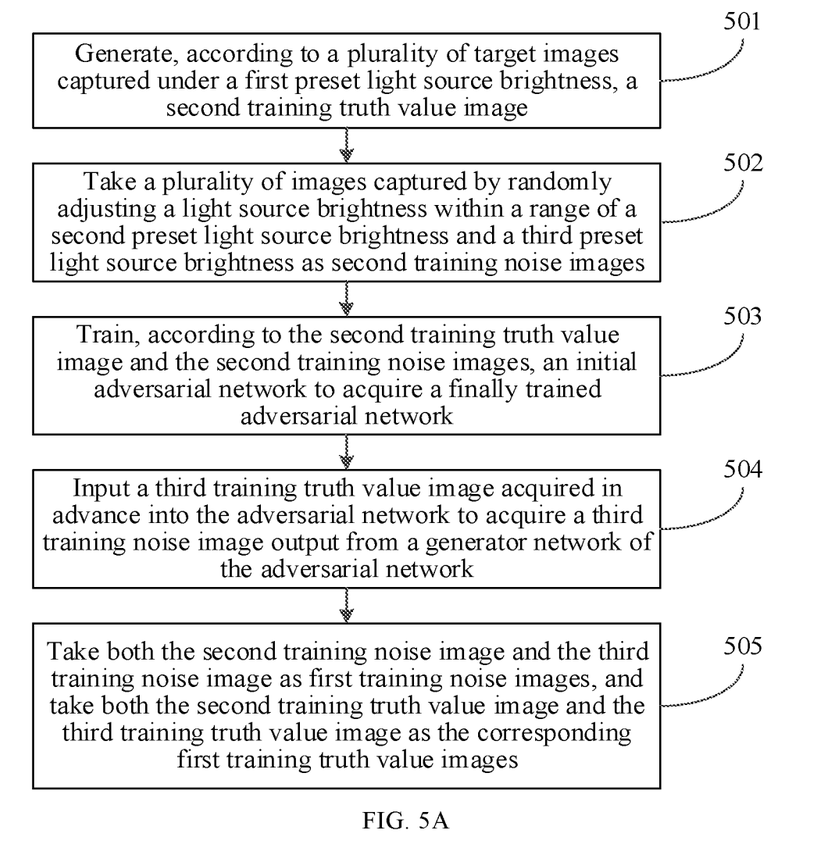
FIG. 5A is a flowchart of acquiring a first training noise image and a corresponding first training truth value image according to the present application.

FIG. 5A is a flowchart of acquiring a first training noise image and a corresponding first training truth value image according to the present application. As shown in FIG. 5A, the acquiring may include the following operations 501 to 505.

At operation 501, generating, according to a plurality of target images captured under a first preset light source brightness, a second training truth value image.

In a possible implementation, the first preset light source brightness may be 200 lux. When the target image is captured under the first preset light source brightness, the camera module is enabled, and denoising algorithm and dead pixel removal algorithm in an image signal processing module are all disabled. The camera and the scenario are kept absolutely still during the capturing, and the number of the target images may be 200.

In a possible implementation, generating the second training truth value image from the plurality of target images may include determining, according to the plurality of target images, an average image of the plurality of target images, and taking the average image of the plurality of target images as the second training truth value image.

In another possible implementation, the plurality of target images may be subjected to operations like dead pixel removal, intensity alignment, or mean value acquisition, to generate a final second training truth value image. This implementation will be described in detail later.

At operation 502, taking a plurality of images captured by randomly adjusting a light source brightness within a range of a second preset light source brightness and a third preset light source brightness as second training noise images.

The second preset light source brightness is lower than the third preset light source brightness, and the third preset light source brightness is lower than the first preset light source brightness.

In an embodiment of the present application, the plurality of images captured by randomly adjusting the light source brightness within the range of the second preset light source brightness and the third preset light source brightness are taken as the second training noise images.

The second preset light source brightness may be 0.1 lux, and the third preset light source brightness may be 100 lux. The number of the second training noise images may be 200. While the second training noise images are captured, camera parameters, such as an analog gain and a digital gain, for each captured second training noise image may be recorded.

It should be noted that, in the embodiments of the present application, the scenario may be changed, and the plurality of target images and the second training noise images may be captured in different scenarios. The second training truth value image is generated from the plurality of target images of a same scenario. For a certain scenario, one second training truth value image corresponds to a plurality of second training noise images.

At operation 503, training, according to the second training truth value image and the second training noise images, an initial adversarial network to acquire a finally trained adversarial network.

In a possible implementation, the adversarial network in the embodiment of the present application may include a generator network and a discriminator network. The generator network and the discriminator network in the adversarial network may each be a U-shaped network.

An initial generator network in the initial adversarial network is configured to generate a noise image, and an initial discriminator network in the initial adversarial network is configured to determine similarity between the noise image output from the initial generator network and an actual second training noise image. According to a loss function of the initial generator network and a loss function of the initial discriminator network, the initial adversarial network is independently and alternately trained in an iterative manner until convergence. The specific process may include the following operations 1 to 3.

At operation 1, inputting normally distributed noises, the second training truth value image, and camera parameters corresponding to any second training noise image into an initial generator network in an initial adversarial network to acquire an output noise image.

At operation 2, inputting the noise image, the second training noise image, the camera parameters corresponding to the second training noise image, and the second training truth value image into an initial discriminator network in the initial adversarial network to acquire an output probability of the initial discriminator network.

At operation 3, determining, according to the output probability, the camera parameters corresponding to the second training noise image, the second training truth value image, and the noise image, a loss function of the initial discriminator network and a loss function of the initial generator network; alternately returning to, when determining that the initial adversarial network is not converged according to the loss function of the initial discriminator network and the loss function of the initial generator network, the operation of inputting the normally distributed noises, the second training truth value image, and the camera parameters corresponding to the second training noise image into the initial generator network in the initial adversarial network to acquire the output noise image, and the operation of inputting the noise image, the second training noise image, the camera parameters corresponding to the second training noise image, and the second training truth value image into the initial discriminator network in the initial adversarial network to acquire the output probability of the initial discriminator network, until the adversarial network is determined to be converged according to the loss function of the initial discriminator network and the loss function of the initial generator network, and determining the converged adversarial network as the finally trained adversarial network.

The output probability of the initial discriminator network is a value between 0 and 1, representing a probability of a true or false noise image. 0 represents the noise image generated from the generator network, and 1 represents the second training noise image actually acquired.

The loss function of the generator network in the adversarial network is:

$$L_G = E[(D(N_c, N_r, N_f))^2] + E[(D(N_c, N_f, N_r) - 1)^2],$$

and the loss function for the discriminator network is:

$$L_D = E[(D(N_c, N_T, N_f) - 1)^2] + E[(D(N_c, N_f, N_r))^2],$$

where $N_c$ represents a conditional signal for generating a noise image, including an analog gain and a digital gain of the camera and the second training truth value image; $N_f$ is the noise image generated from the generator network, $N_r$ is the second training noise image actually acquired, $D(*)$ represents output from the discriminator network, and $E(*)$ represents average.

At operation 504, inputting a third training truth value image acquired in advance into the adversarial network to acquire a third training noise image output from the generator network of the adversarial network.

After the adversarial network is trained, a third training truth value image acquired in advance may be input into the adversarial network to acquire a third training noise image output from the generator network of the adversarial network.

At operation 505, taking both the second training noise image and the third training noise image as first training noise images, and taking both the second training truth value image and the third training truth value image as the corresponding first training truth value images.

In an embodiment of the present application, both the second training noise image actually gathered and the third training noise image generated from the adversarial network may be taken as first training noise images for training the image denoising model, and both the second training truth value image and the third training truth value image are taken as the corresponding first training truth value images. By generating pairs of training samples with the adversarial network, the number of the training samples is greatly enlarged, based on which the image denoising model can be sufficiently trained to improve the denoising performance of the image denoising model.

At operation 402, inputting the first training noise image into an initial image denoising model to acquire an output result.

At operation 403, determining a loss function according to the output result and the corresponding first training truth value image.

At operation 404, adjusting, when the loss function is greater than a preset threshold, a network architecture and network parameters of the initial image denoising model according to the loss function, determining an updated image denoising model, taking the updated image denoising model as a new initial image denoising model, returning to the operation of inputting the first training noise image into the initial image denoising model to acquire the output result, until the loss function is smaller than or equal to the preset threshold, and determining the image denoising model when the loss function is smaller than or equal to the preset threshold as the image denoising model.

Operations 402 to 404 show a process of iteratively training the image denoising model.

Since the first training noise images acquired in operation 401 are relatively rich in the number, training the image denoising model based on these first training noise images can significantly improve the denoising performance and the generalization capability of the image denoising model.

Figure 5B:
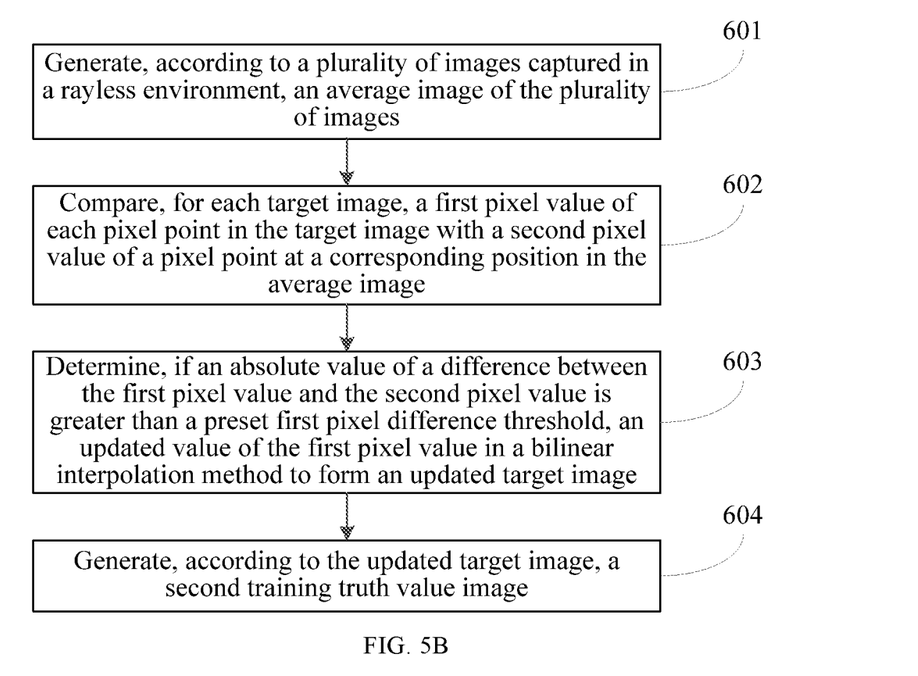
FIG. 5B is a flowchart of generating a second training truth value image according to the present application.

FIG. 5B is a flowchart of generating a second training truth value image according to the present application. As shown in FIG. 5B, the process of generating the second training truth value image may include the following operations 601 to 604.

At operation 601, generating, according to a plurality of images captured in a rayless environment, an average image of the plurality of images.

Each pixel point in the average image has a pixel value being an average value of pixel values of pixel points at corresponding positions of all images captured in the rayless environment.

At operation 602, comparing, for each target image, a first pixel value of each pixel point in the target image with a second pixel value of a pixel point at a corresponding position in the average image.

At operation 603, determining, if an absolute value of a difference between the first pixel value and the second pixel value is greater than a preset first pixel difference threshold, an updated value of the first pixel value in a bilinear interpolation method to form an updated target image.

Operations 601 to 603 show a dead pixel removal process. Dead pixels will affect the accuracy in truth value image estimation, because they do not follow the stochastic process of generating noises at normal pixel positions. If an absolute value of a difference between the first pixel value and the second pixel value is greater than a preset first pixel difference threshold, it indicates that the pixel point corresponding to the first pixel value is a defective pixel point. The updated value of the first pixel value is determined in a bilinear interpolation method. After all the dead pixels are corrected, an updated target image is formed. If, in a certain target image, the absolute value of the difference between the first pixel value of each pixel point and the second pixel value of the pixel point at the corresponding position in the average image is smaller than or equal to the preset first pixel difference threshold, the target image is taken as an updated target image.

At operation 604, generating, according to the updated target image, the second training truth value image.

In a possible implementation, an average image of a plurality of updated target images may be taken as the second training truth value image.

In another possible implementation, operation 604 may specifically include: determining, for each updated target image, an average pixel value of all pixel points in the updated target image; determining, according to the average pixel value of each updated target image, an average value of average pixel values of a plurality of updated target images; discarding an updated target image of which an absolute value of a difference between a corresponding average pixel value and the average value of the average pixel values is greater than a preset second pixel difference threshold, to form filtered updated target images; generating, according to the filtered updated target images, the second training truth value image.

This implementation achieves intensity alignment of pictures. Due to the inaccuracy of the exposure algorithm, it is still desired to consider small changes in the captured pictures under the same scenario and same brightness. The updated target image of which an absolute value of a difference between a corresponding average pixel value and the average value of the average pixel values is greater than a preset second pixel difference threshold is discarded.

According to the average pixel value of each updated target image, an average value and a variance of the average pixel value of the plurality of updated target images. A confidence interval is derived from the average value and the variance, and images outside the confidence interval are then discarded.

In a possible implementation, generating, according to the filtered updated target images, the second training truth value image includes: updating, for each filtered updated target image if a pixel value at a first position of the filtered updated target image is smaller than or equal to a preset first pixel threshold or greater than or equal to a preset second pixel threshold, the pixel value at the first position to a pixel value, among pixel values at first positions of all the filtered updated target images, which appears most times, and generating secondary updated filtered target images, where the first pixel threshold is smaller than the second pixel threshold; and determining an average image of all the secondary updated filtered target images as the second training truth value image. For example, the preset first pixel threshold may be 0, and the preset second pixel threshold may be 255.

Figure 6:
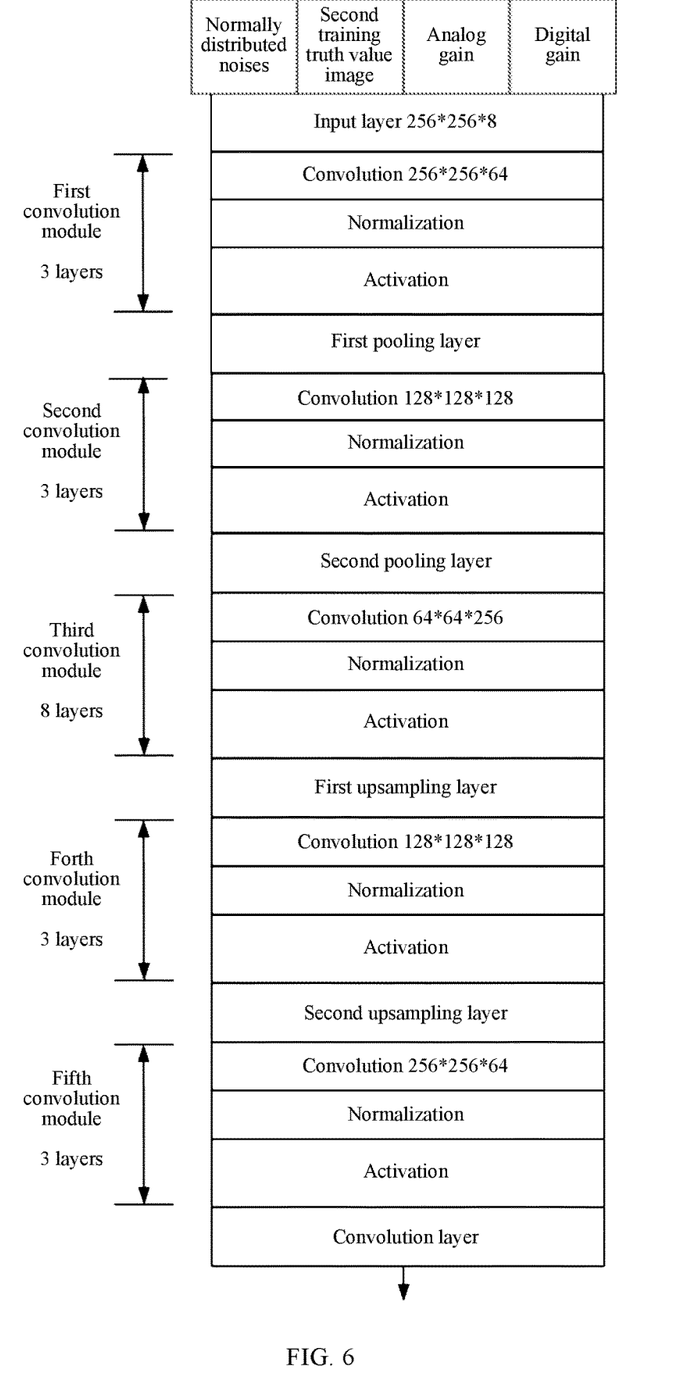
FIG. 6 is a schematic structural diagram of a generator network in an adversarial network according to the present application.

FIG. 6 is a schematic structural diagram of a generator network in an adversarial network according to the present application. As shown in FIG. 6, the generator network may include: an input layer, a 3-layer first convolution module, a first pooling layer, a 3-layer second convolution module, a second pooling layer, an 8-layer third convolution module, a first upsampling layer, a 3-layer fourth convolution modules, a second upsampling layer, a 3-layer fifth convolution modules, and a convolutional layer which are connected in sequence. Each convolution module includes a convolutional layer, a normalization layer, and an activation layer. Each convolutional kernel involved in the generator network is 3*3. The image resolution and the number of channels in each layer or each module are as shown in the figure. In the input layer, the image resolution is 256*256, and the number of channels is 8; in the convolutional layer of the first convolution module, the image resolution is 256*256, and the number of channels is 64; in the convolutional layer of the second convolution module, the image resolution is 128*128, and the number of channels is 128; in the convolutional layer of the third convolution module, the image resolution is 64*64, and the number of channels is 256; in the convolutional layer of the fourth convolution module, the image resolution is 128*128, and the number of channels is 128; and in the convolutional layer of the fifth convolution module, the image resolution is 256*256, and the number of channels is 64.

Figure 7:
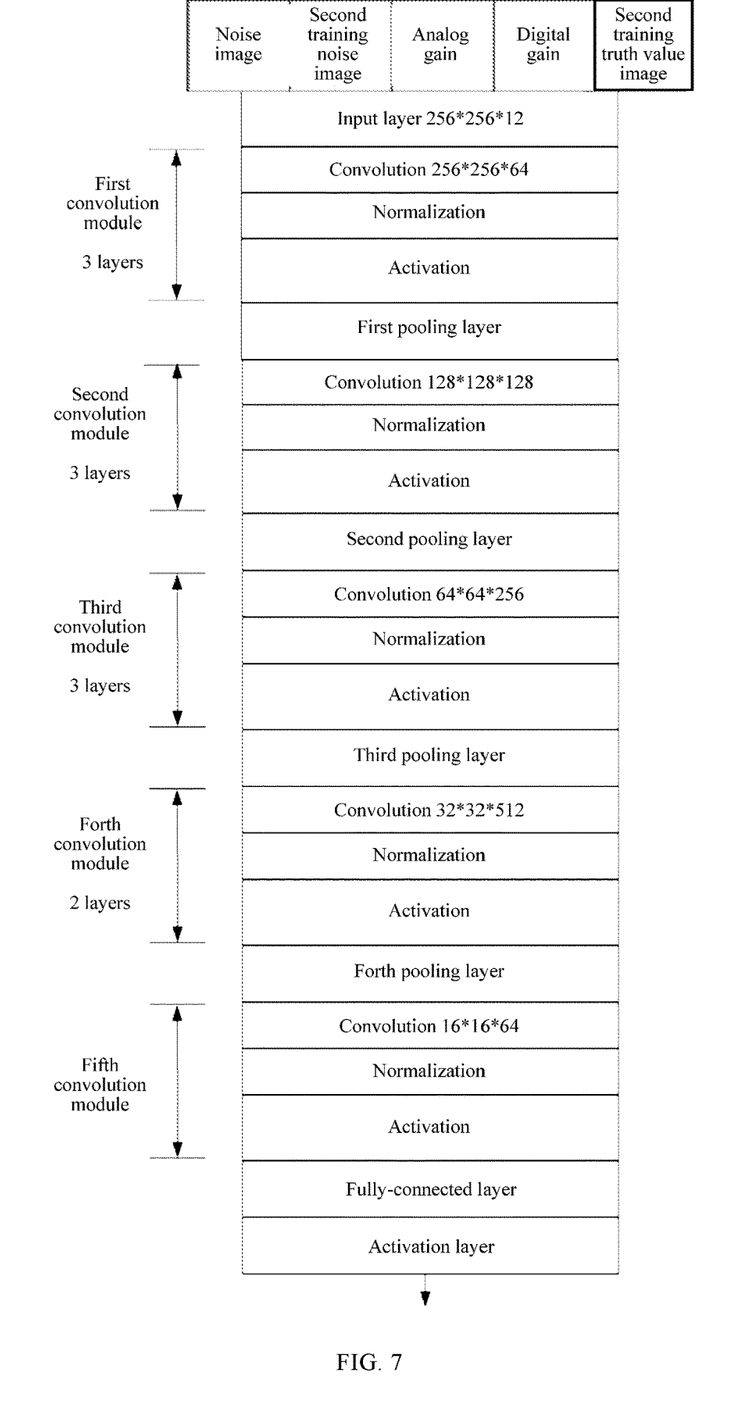
FIG. 7 is a schematic structural diagram of a discriminator network in the adversarial network according to the present application.

FIG. 7 is a schematic structural diagram of a discriminator network in the adversarial network according to the present application. As shown in FIG. 7, the discriminator network may include: an input layer, a 3-layer first convolution modules, a first pooling layer, a 3-layer second convolution modules, a second pooling layer, a 3-layer third convolution modules, a third pooling layer, a 2-layer fourth convolution modules, a fourth pooling layer, a fifth convolution module, a fully-connected layer, and an activation layer which are connected in sequence. An activation function of the activation layer may be a Sigmoid function. Each convolution module includes a convolutional layer, a normalization layer, and an activation layer. Each convolutional kernel involved in the discriminator network is 3*3. The image resolution and the number of channels in each layer or each module are as shown in the figure. In the input layer, the image resolution is 256*256, and the number of channels is 12; in the convolutional layer of the first convolution module, the image resolution is 256*256, and the number of channels is 64; in the convolutional layer of the second convolution module, the image resolution is 128*128, and the number of channels is 128; in the convolutional layer of the third convolution module, the image resolution is 64*64, and the number of channels is 256; in the convolutional layer of the fourth convolution module, the image resolution is 32*32, and the number of channels is 512; and in the convolutional layer of the fifth convolution module, the image resolution is 16*16, and the number of channels is 64.

According to the image denoising method according to the embodiments of the present application, both the second training noise image actually gathered and the third training noise image generated from the adversarial network may be taken as first training noise images for training the image denoising model, and both the second training truth value image and the third training truth value image are taken as the corresponding first training truth value images. By generating pairs of training samples with the adversarial network, the number of the training samples is greatly enlarged, based on which the image denoising model can be sufficiently trained to improve the denoising performance of the image denoising model.

Figure 8:
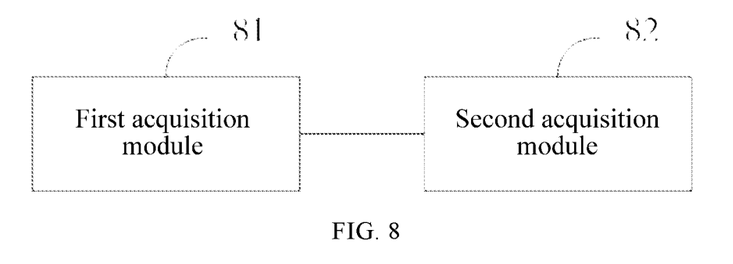
FIG. 8 is a schematic structural diagram of an image denoising apparatus according to the present application.

FIG. 8 is a schematic structural diagram of an image denoising apparatus according to the present application. As shown in FIG. 8, the image denoising apparatus of the present application may include: a first acquisition module 81 and a second acquisition module 82.

The first acquisition module 81 may be configured to acquire an image to be processed.

The second acquisition module 82 may be configured to input the image to be processed into an image denoising model to acquire a denoised image.

The image denoising model may be a model formed by combining a U-shaped network, a residual network and a dense network.

In a possible implementation, the image denoising model may include: an input layer, a first convolutional layer, at least one dense residual module, a dense residual block, at least one upsampling module, a second convolutional layer, a third convolutional layer, and an output layer which are connected in sequence.

A subtraction operation is performed on an output of the input layer and an output of the third convolutional layer, and a result of the subtraction operation is input to an input of the output layer.

An addition operation is performed on an output of the first convolutional layer and an output of the second convolutional layer, and a result of the addition operation is input to an input of the third convolutional layer.

The dense residual module may include a first dense residual submodule and a convolution submodule which are connected in sequence, and the upsampling module may include an upsampling submodule and a second dense residual submodule which are connected in sequence. An addition operation is performed on an output of the first dense residual submodule and an input of the upsampling submodule.

In a possible implementation, the first dense residual submodule may include: a fourth convolutional layer, a fifth convolutional layer, a sixth convolutional layer, and a seventh convolutional layer which are connected in sequence.

An addition operation is performed on an input of the fourth convolutional layer and an input of the seventh convolutional layer.

A fusion operation is performed on an input of the fifth convolutional layer and the input of the fourth convolutional layer.

A fusion operation is performed on an input of the sixth convolutional layer, an output of the fourth convolutional layer, and the input of the fourth convolutional layer.

A fusion operation is performed on the input of the seventh convolutional layer, the input of the fourth convolutional layer, an output of the fifth convolutional layer, and the output of the fourth convolutional layer.

The image denoising apparatus according to the embodiments of the present application may be configured to execute the image denoising method according to any of the above possible implementations, and the implementation principle and the technical effect of the image denoising apparatus according to the embodiments of the present application are similar thereto, and thus are not repeated here.

Figure 9:
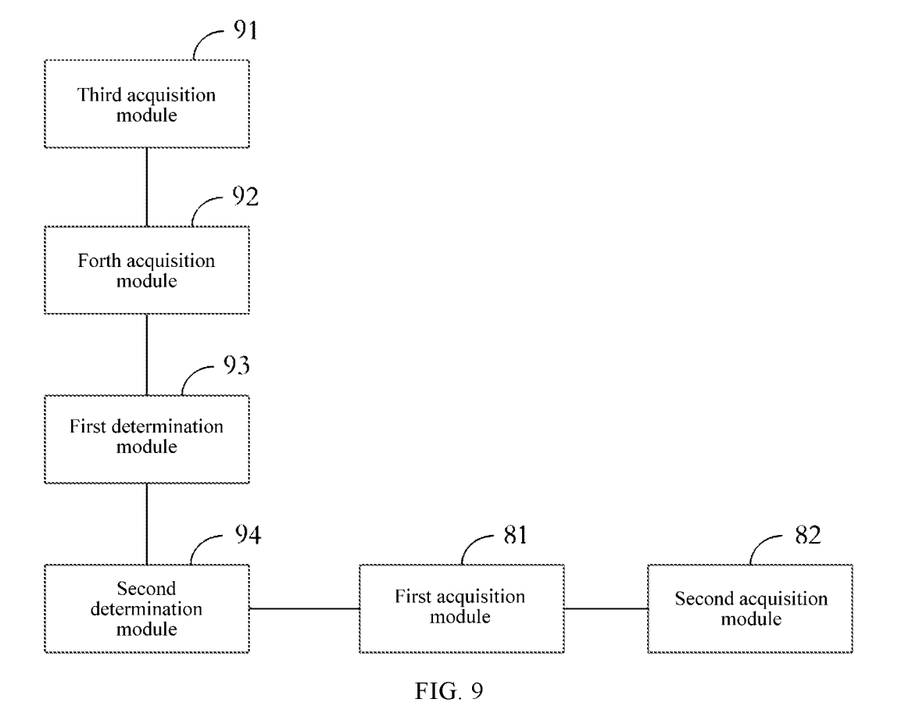
FIG. 9 is another schematic structural diagram of an image denoising apparatus according to the present application.

FIG. 9 is another schematic structural diagram of an image denoising apparatus according to the present application. Other modules included in the image denoising apparatus are described in detail below on the basis of the possible implementation shown in FIG. 8. As shown in FIG. 9, the image denoising apparatus of the present application may further include the following modules: a third acquisition module 91, a fourth acquisition module 92, a first determination module 93, and a second determination module 94.

The third acquisition module 91 may be configured to acquire a first training noise image and a corresponding first training truth value image.

The fourth acquisition module 92 may be configured to input the first training noise image into an initial image denoising model to acquire an output result.

The first determination module 93 may be configured to determine a loss function according to the output result and the corresponding first training truth value image.

The second determination module 94 may be configured to, adjust, when the loss function is greater than a preset threshold, a network architecture and network parameters of the initial image denoising model according to the loss function, determine an updated image denoising model, take the updated image denoising model as a new initial image denoising model, return to the operation of inputting the first training noise image into the initial image denoising model to acquire the output result, until the loss function is smaller than or equal to the preset threshold, and determine the image denoising model when the loss function is smaller than or equal to the preset threshold as the image denoising model.

The image denoising apparatus according to the embodiments of the present application may be configured to execute the image denoising method according to any of the above possible implementations, and the implementation principle and the technical effect of the image denoising apparatus according to the embodiments of the present application are similar thereto, and thus are not repeated here.

Figure 10:
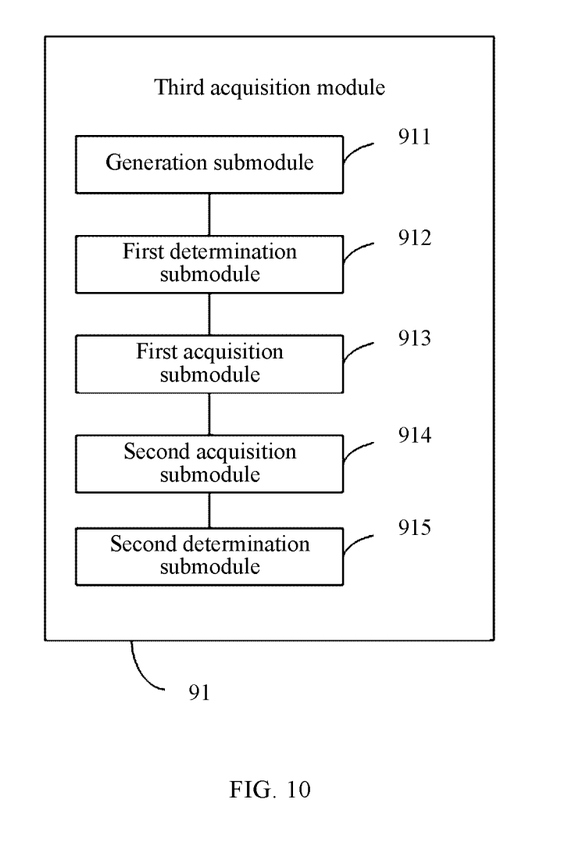
FIG. 10 is another schematic structural diagram of an image denoising apparatus according to the present application.

FIG. 10 is another schematic structural diagram of an image denoising apparatus according to the present application. A specific structure of the third acquisition module 91 is described in detail below on the basis of the possible implementation shown in FIG. 9. As shown in FIG. 10, the third acquisition module 91 may include: a generation submodule 911, a first determination submodule 912, a first acquisition submodule 913, a second acquisition submodule 914, and a second determination submodule 915.

The generation submodule 911 may be configured to generate, according to a plurality of target images captured under a first preset light source brightness, a second training truth value image.

In a possible implementation, the generation submodule 911 may be specifically configured to: generate, according to a plurality of images captured in a rayless environment, an average image of the plurality of images; compare, for each target image, a first pixel value of each pixel point in the target image with a second pixel value of a pixel point at a corresponding position in the average image; determine, if an absolute value of a difference between the first pixel value and the second pixel value is greater than a preset first pixel difference threshold, an updated value of the first pixel value in a bilinear interpolation method to form an updated target image; and generate, according to the updated target image, a second training truth value image.

In a possible implementation, regarding the aspect of generating, according to the updated target image, the second training truth value image, the generation submodule 911 may be specifically configured to: determine, for each updated target image, an average pixel value of all pixel points in the updated target image; determine, according to the average pixel value of each updated target image, an average value of average pixel values of a plurality of updated target images; discard an updated target image of which an absolute value of a difference between a corresponding average pixel value and the average value of the average pixel values is greater than a preset second pixel difference threshold, to form filtered updated target images; and generate, according to the filtered updated target images, the second training truth value image.

In a possible implementation, regarding the aspect of generating, according to the filtered updated target images, the second training truth value image, the generation submodule 911 may be specifically configured to: update, for each filtered updated target image if a pixel value at a first position of the filtered updated target image is smaller than or equal to a preset first pixel threshold or greater than or equal to a preset second pixel threshold, the pixel value at the first position to a pixel value, among pixel values at first positions of all the filtered updated target images, which appears most times, and generate secondary updated filtered target images, where the first pixel threshold is smaller than the second pixel threshold; and determine an average image of all the secondary updated filtered target images as the second training truth value image.

The first determination submodule 912 may be configured to take a plurality of images captured by randomly adjusting a light source brightness within a range of a second preset light source brightness and a third preset light source brightness as second training noise images.

The second preset light source brightness is lower than the third preset light source brightness, and the third preset light source brightness is lower than the first preset light source brightness.

The first acquisition submodule 913 may be configured to train, according to the second training truth value image and the second training noise images, an initial adversarial network to acquire a finally trained adversarial network.

In a possible implementation, the first acquisition submodule 913 may be specifically configured to: input normally distributed noises, the second training truth value image, and camera parameters corresponding to any second training noise image into an initial generator network in an initial adversarial network to acquire an output noise image; input the noise image, the second training noise image, camera parameters corresponding to the second training noise image and the second training truth value image into an initial discriminator network in the initial adversarial network to acquire an output probability of the initial discriminator network; and determine, according to the output probability, the camera parameters corresponding to the second training noise image, the second training truth value image, and the noise image, a loss function of the initial discriminator network and a loss function of the initial generator network, alternately return to, when determining that the initial adversarial network is not converged according to the loss function of the initial discriminator network and the loss function of the initial generator network, the operation of inputting the normally distributed noises, the second training truth value image, and the camera parameters corresponding to the second training noise image into the initial generator network in the initial adversarial network to acquire the output noise image, and the operation of inputting the noise image, the second training noise image, the camera parameters corresponding to the second training noise image, and the second training truth value image into the initial discriminator network in the initial adversarial network to acquire the output probability of the initial discriminator network, until the adversarial network is determined to be converged according to the loss function of the initial discriminator network and the loss function of the initial generator network, and determine the converged adversarial network as the finally trained adversarial network.

In a possible implementation, the generator network and the discriminator network in the adversarial network may each be a U-shaped network.

The second acquisition submodule 914 may be configured to input a third training truth value image acquired in advance into the adversarial network to acquire a third training noise image output from a generator network of the adversarial network.

The second determination submodule 915 may be configured to take both the second training noise image and the third training noise image as first training noise images, and take both the second training truth value image and the third training truth value image as the corresponding first training truth value images.

The image denoising apparatus of the present application may be configured to implement the image denoising method according to any of the above possible implementations, and the implementation principle and the technical effect of the image denoising apparatus of the present application are similar thereto, and thus are not repeated here.

Figure 11:
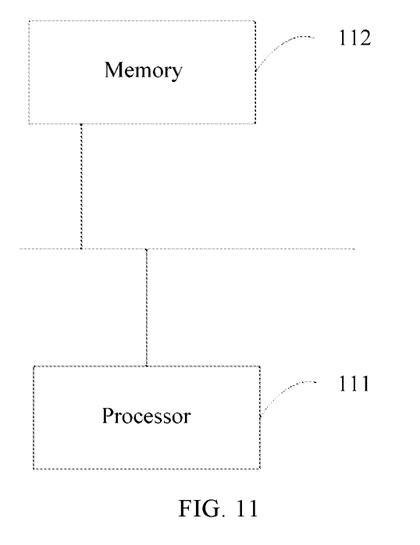
FIG. 11 is a schematic structural diagram of an electronic device according to the present application.

FIG. 11 is a schematic structural diagram of an electronic device according to the present application. As shown in FIG. 11, the electronic device may include a processor 111 and a memory 112. There may be one or more processors 111 in the electronic device, and one processor 111 is shown as an example in FIG. 11. The processor 111 and the memory 112 in the electronic device may be connected via a bus or by other means, and FIG. 11 illustrates the connection by a bus as an example.

The memory 112, as a computer-readable storage medium, may be configured to store software programs, computer-executable programs, and modules, such as program instructions/modules corresponding to the image denoising method in the embodiments state present application (such as the first acquisition state module 81 and the second acquisition module 82 in the image denoising apparatus). The processor 111 executes the software programs, instructions and modules stored in the memory 112 to perform various functional applications and data processing of the electronic device, i.e., to implement the image denoising method as described above.

The memory 112 may mainly include a program storage area and a data storage area. The program storage area may store an operating system, or an application program required for at least one function; and the data storage area may store data created according to the use of the electronic device, and the like. Further, the memory 112 may include a high speed random access memory, and may further include a non-volatile memory, such as at least one magnetic disk memory device, flash memory device, or other non-volatile solid state memory devices.

The present application further provides a storage medium containing computer-executable instructions which, when executed by a computer processor, cause the image denoising method to be implemented, the method including: acquiring an image to be processed; and inputting the image to be processed into an image denoising model to acquire a denoised image. The image denoising model is a model formed by combining a U-shaped network, a residual network and a dense network.

Apparently, according to the storage medium containing computer-executable instructions provided in the present application, the computer-executable instructions are not limited to the above method operations, and may further cause the relevant operations in image denoising method according to any possible implementations of the present application to be implemented.

The above are only exemplary embodiments of the present application and not intended to limit the scope of the present application.

In general, the various possible implementations of the present application may be implemented in hardware or dedicated circuits, software, logic or any combination thereof. For example, some aspects may be implemented in hardware, while other aspects may be implemented in firmware or software which may be executed by a controller, microprocessor or other computing device, although the application is not limited thereto.

Embodiments of the present application may be implemented by a data processor of a mobile device executing computer program instructions, for example in a processor entity, or by hardware, or by a combination of software and hardware. The computer program instructions may be assembler instructions, instruction set architecture (ISA) instructions, machine instructions, machine-related instructions, microcode, firmware instructions, state setting data, or source codes or object codes written in any combination of one or more programming languages.

The block diagrams of any logic flow in the figures of the present application may represent program operations, or may represent interconnected logic circuits, modules, and functions, or may represent a combination of program operations and logic circuits, modules, and functions. The computer program may be stored on a memory. The memory may be of any type suitable to the local technical environment and may be implemented using any suitable data storage technology, such as but not limited to, read-only memories (ROMs), random access memories (RAMs), optical storage devices or systems (digital versatile discs (DVDs), compact discs (CDs)), etc. The computer-readable medium may include a non-transitory storage medium. The data processor may be of any type suitable to the local technical environment, such as but not limited to, general purpose computers, dedicated computers, microprocessors, digital signal processors (DSPs), application specific integrated circuits (ASICs), field-programmable gate arrays (FGPAs), and processors based on multi-core processor architecture.

The foregoing has provided by way of exemplary and non-limiting examples a detailed description of exemplary embodiments of the present application. Various modifications and adaptations to the foregoing embodiments may become apparent to those skilled in the art in view of the accompanying drawings and the appended claims, without departing from the scope of the present application. Accordingly, the proper scope of the present application is to be determined according to the claims.

What is claimed is:

1. An image denoising method, comprising:
   acquiring an image to be processed; and
   inputting the image to be processed into an image denoising model to acquire a denoised image,
   wherein the image denoising model is a model formed by combining a U-shaped network, a residual network and a dense network, wherein the image denoising model comprises: an input layer, a first convolutional layer, at least one dense residual module, a dense residual block, at least one upsampling module, a second convolutional layer, a third convolutional layer, and an output layer which are connected in sequence;

wherein a subtraction operation is performed on an output of the input layer and an output of the third convolutional layer, and a result of the subtraction operation is input to an input of the output layer;

an addition operation is performed on an output of the first convolutional layer and an output of the second convolutional layer, and a result of the addition operation is input to an input of the third convolutional layer;

the at least one dense residual module comprises a first dense residual submodule and a convolution submodule which are connected in sequence;

the at least one upsampling module comprises an upsampling submodule and a second dense residual submodule which are connected in sequence; and an addition operation is performed on an output of the first dense residual submodule and an input of the upsampling submodule.

2. The method according to claim 1, wherein the first dense residual submodule comprises: a fourth convolutional layer, a fifth convolutional layer, a sixth convolutional layer, and a seventh convolutional layer which are connected in sequence;

wherein an addition operation is performed on an input of the fourth convolutional layer and an input of the seventh convolutional layer;

a fusion operation is performed on an input of the fifth convolutional layer and the input of the fourth convolutional layer;

a fusion operation is performed on an input of the sixth convolutional layer, an output of the fourth convolutional layer, and the input of the fourth convolutional layer; and a fusion operation is performed on the input of the seventh convolutional layer, the input of the fourth convolutional layer, an output of the fifth convolutional layer, and the output of the fourth convolutional layer.

3. The method according to claim 1, wherein before inputting the image to be processed into the image denoising model to acquire the denoised image, the method further comprises:

acquiring a first training noise image and a corresponding first training truth value image;

inputting the first training noise image into an initial image denoising model to acquire an output result;

determining a loss function according to the output result and the corresponding first training truth value image; and adjusting, in response to the fact that the loss function is greater than a preset threshold, a network architecture and network parameters of the initial image denoising model according to the loss function, determining an updated image denoising model, taking the updated image denoising model as a new initial image denoising model, returning to the operation of inputting the first training noise image into the initial image denoising model to acquire the output result, until the loss function is smaller than or equal to the preset threshold, and determining the image denoising model when the loss function is smaller than or equal to the preset threshold as the image denoising model.

4. The method according to claim 3, wherein acquiring the first training noise image and the corresponding first training truth value image comprises:

generating, according to a plurality of target images captured under a first preset light source brightness, a second training truth value image;

taking a plurality of images captured by randomly adjusting a light source brightness within a range of a second preset light source brightness and a third preset light source brightness as second training noise images, wherein the second preset light source brightness is lower than the third preset light source brightness, and the third preset light source brightness is lower than the first preset light source brightness;

training, according to the second training truth value image and the second training noise images, an initial adversarial network to acquire a finally trained adversarial network;

inputting a third training truth value image acquired in advance into the adversarial network to acquire a third training noise image output from a generator network of the adversarial network; and taking both the second training noise image and the third training noise image as first training noise images, and taking both the second training truth value image and the third training truth value image as the corresponding first training truth value images.

5. The method according to claim 4, wherein generating, according to the plurality of target images captured under the first preset light source brightness, the second training truth value image comprises:

generating, according to a plurality of images captured in a rayless environment, an average image of the plurality of images;

comparing, for each target image, a first pixel value of each pixel point in the target image with a second pixel value of a pixel point at a corresponding position in the average image;

determining, in response to the fact that an absolute value of a difference between the first pixel value and the second pixel value is greater than a preset first pixel difference threshold, an updated value of the first pixel value in a bilinear interpolation method to form an updated target image; and generating, according to the updated target image, the second training truth value image.

6. The method according to claim 5, wherein generating, according to the updated target image, the second training truth value image comprises:

determining, for each updated target image, an average pixel value of all pixel points in the updated target image;

determining, according to the average pixel value of each updated target image, an average value of average pixel values of a plurality of updated target images;

discarding an updated target image of which an absolute value of a difference between a corresponding average pixel value and the average value of the average pixel values is greater than a preset second pixel difference threshold, to form filtered updated target images; and generating, according to the filtered updated target images, the second training truth value image.

7. The method according to claim 6, wherein generating, according to the filtered updated target images, the second training truth value image comprises:

updating, for each filtered updated target image and in response to the fact that a pixel value at a first position of the filtered updated target image is smaller than or equal to a preset first pixel threshold or greater than or equal to a preset second pixel threshold, the pixel value at the first position to a pixel value, among pixel values at first positions of all the filtered updated target images, which appears most times, and generating secondary updated filtered target images, wherein the first pixel threshold is smaller than the second pixel threshold; and determining an average image of all the secondary updated filtered target images as the second training truth value image.

8. The method according to claim 4, wherein training, according to the second training truth value image and the second training noise images, the initial adversarial network to acquire the finally trained adversarial network comprises:

inputting normally distributed noises, the second training truth value image, and camera parameters corresponding to any second training noise image into an initial generator network in the initial adversarial network to acquire an output noise image;

inputting the noise image, the second training noise image, camera parameters corresponding to the second training noise image, and the second training truth value image into an initial discriminator network in the initial adversarial network to acquire an output probability of the initial discriminator network; and determining, according to the output probability, the camera parameters corresponding to the second training noise image, the second training truth value image, and the noise image, a loss function of the initial discriminator network and a loss function of the initial generator network, alternately returning to, in response to determining that the initial adversarial network is not converged according to the loss function of the initial discriminator network and the loss function of the initial generator network, the operation of inputting the normally distributed noises, the second training truth value image, and the camera parameters corresponding to the second training noise image into the initial generator network in the initial adversarial network to acquire the output noise image, and the operation of inputting the noise image, the second training noise image, the camera parameters corresponding to the second training noise image, and the second training truth value image into the initial discriminator network in the initial adversarial network to acquire the output probability of the initial discriminator network, until the adversarial network is determined to be converged according to the loss function of the initial discriminator network and the loss function of the initial generator network, and determining the converged adversarial network as the finally trained adversarial network.

9. The method according to claim 4, wherein the generator network and the discriminator network in the adversarial network are each a U-shaped network.

10. An electronic device, comprising:
one or more processors; and
a memory configured to store one or more programs,
wherein the one or more programs, when executed by the one or more processors, cause the one or more processors to implement the image denoising method according to claim 1.

11. A non-transitory computer-readable storage medium having a computer program stored thereon which, when executed by a processor, causes the processor to implement the image denoising method according to claim 1.

* * * * *